Aug. 21, 1945.   G. COURTNEY   2,382,962
EYEGLASSES
Filed Jan. 17, 1944
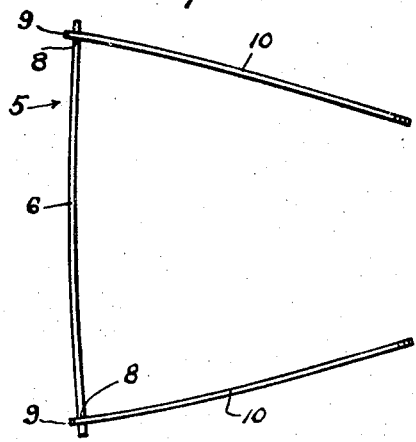
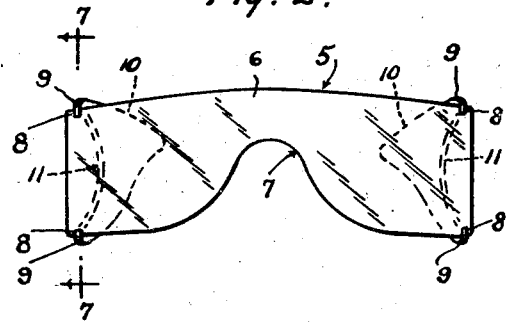
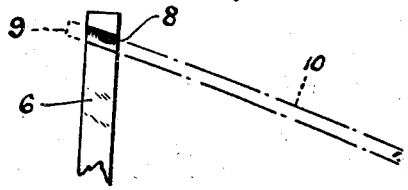
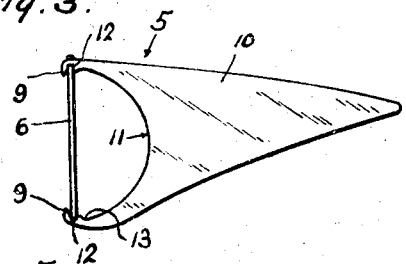
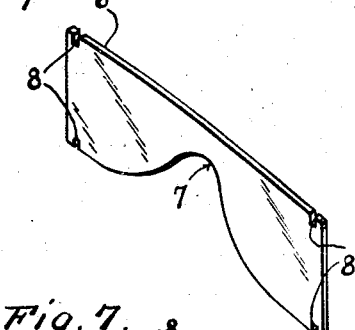
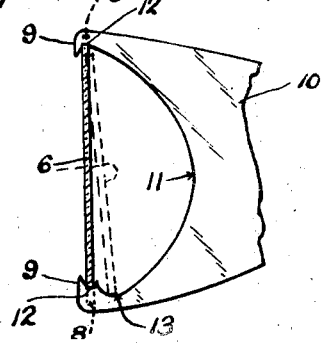
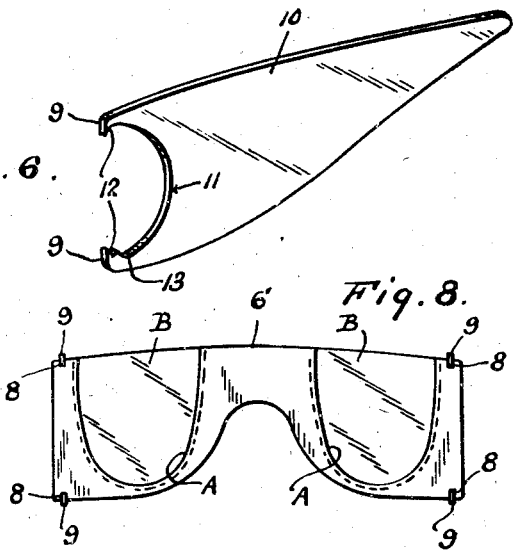
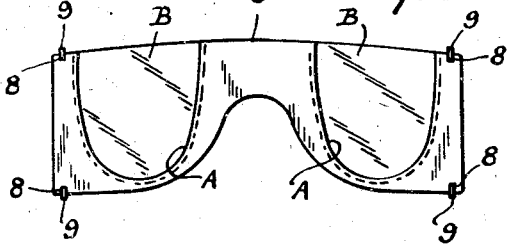
Inventor
Gerald Courtney
By L. B. James
Attorney Patented Aug. 21, 1945

2,382,962

UNITED STATES PATENT OFFICE 2,382,962

EYEGLASSES

Gerald Courtney, Hollywood, Calif.

Application January 17, 1944, Serial No. 518,599

3 Claims. (Cl. 88—41)

This invention relates to optics and more particularly eyeglasses, spectacles, sun glasses and the like.

The primary object of this invention resides in the provision of a pair of eyeglasses adapted to have temples which can readily be removed from the nose piece without the use of tools.

A further object of this invention resides in the provision of a pair of eyeglasses having removable temples adapted to bear against the sides of an individual's head forwardly of or adjacent his ears to retain the eyeglasses in proper relation to his eyes.

A further object of this invention resides in the particular connection of the temples to the nose piece or eyeshade proper whereby the temples will assume angles that will necessitate their being sprung outwardly to yieldingly bear against the sides of an individual's head.

A still further object of this invention resides in the particular construction of the temples whereby the individual wearing the glasses may look through open spaces in the forward portions of the same.

Aside from the aforesaid objects this invention resides in the provision of a pair of eyeglasses having a nose piece adapted to removably receive the lenses and temples.

In addition to the aforesaid objects this invention resides in the particular construction of the joint between the nose piece and temples.

With these and other objects in view this invention resides in certain novel features of construction and arrangement of elements to be hereinafter more particularly set forth in the specification, illustrated in the accompanying drawing and pointed out in the appended claims and, while this disclosure depicts my present conception of the invention, the right is reserved to such changes in construction and arrangement of elements as fall within the spirit of the invention.

In the accompanying drawing forming a part of this application;

Fig. 1 is a plan view of a pair of glasses constructed in accordance with this invention.

Fig. 2 is a front view thereof.

Fig. 3 is a side view thereof.

Fig. 4 is an enlarged plan view of one side of the nose piece showing a temple in dotted lines.

Fig. 5 is a perspective view of the nose piece.

Fig. 6 is a perspective view of one of the temples.

Fig. 7 is an enlarged sectional view approximately on line 7—7 of Fig. 2.

Fig. 8 is a front view of a modified form of the eyeglasses.

In the present illustration of this invention the numeral 5 designates in general, a pair of eyeglasses consisting of a nose piece 6 formed of transparent, translucent, colored or any suitable material whereby protection of the eyes is afforded, the same being provided with a nose rest 7 in its lower side and divergently disposed slots 8 in its upper edge adjacent the ends thereof.

Adapted to be removably connected to the aforesaid nose piece 6 are temples 10 formed of suitable material and shaped to meet the demands of the public or in other words, to have such configurations as will meet the fancy of the trade. The forward portions of the aforesaid temples are cut out as at 11 or in other optional shapes to permit the wearer of the glasses to look therethrough and formed on the outer ends of the temples are lugs 9 having seats 12 therein adapted to rest on the bases of the slots 8 with the forward portions of the lugs 9 slightly overhanging the outer surface of the nose piece 6 and, in order to facilitate ready assemblage of the temples on the nose piece, the slot 11 is extended at one end as indicated by the numeral 13 below one of the seats 12, said increased area of the slot adjacent one of the seats 12 permitting the nose piece to be lowered within the slot 11 and forced into locking engagement with the temple which will remain fixed to the nose piece for yielding pressure against the sides of an individual's head. Of course the pressure this obtained will be comfortable to the wearer and require no engagement of the temples behind his ears as usually required with articles of this character.

In Fig. 8 of the drawing, the numeral 6' indicates a modified form of the nose piece, the same being constructed of any suitable material and provided with slots A adjacent its side edges to removably receive lenses B which may be made of any suitable material whereby the individual wearing same may look through. This form of the nose piece is also constructed similar to the preferred form so as to removably accommodate the temple 10 in a manner heretofore set forth.

Although this invention is shown in Figs. 1 to 7 as being applicable to a transparent or other similarly constructed nose piece formed in a single unit, it is within the purview of this invention to practice the same with eyeglasses, sun glasses, spectacles, goggles and other eye protecting articles constructed so as to be carried by frames, nose pieces, supports and the like.

With this invention fully set forth, it is manifest that a pair of eyeglasses is provided whereby the temples thereof can be readily removed and, through the simplicity of construction thereof, the cost of manufacture will be reasonable.

Having thus described my invention what I claim and desire to protect by Letters Patent is:

1. The combination with a nose piece comprising a flat sheet of material adapted to be fitted over the nose of a wearer and extending on each side to points in line with the wearer's temples and having diverging slots at the extremities of its upper and lower edges, and temples having cut out forward ends with their upper and lower extremities removably seated in the aforesaid slots and normally diverging from their free ends toward the nose piece.

2. The combination with a transparent nose piece comprising a flat sheet of material adapted to be fitted over the nose of a wearer and extending on each side to points approximately in line with the wearer's temples and having pairs of diverging slots at the extremities of its upper and lower edges said slots being disposed on substantially horizontal lines converging rearwardly from the ends of the nose piece, and temples having their free ends seated in said slots and normally lying on the converging lines occupied thereby, said temples being rigidly fixed in the slots and yieldable sidewise therebeyond.

3. The combination with a nose piece comprising a substantially flat piece of material adapted to be fitted over the nose of a wearer and extending on each side to points in line with the wearer's temples and having openings on opposite sides of the nose rest with angularly disposed slots formed in the upper and lower extremities of the outer walls of said openings, removable lens disposed in the aforesaid openings, and removable temples having their forward portions seated in the angular slots and normally disposed in converging relation rearwardly of the nose piece.

GERALD COURTNEY.